US012583146B2

(12) United States Patent
Hand et al.

(10) Patent No.: US 12,583,146 B2
(45) Date of Patent: Mar. 24, 2026

(54) COMPOSITE PRODUCTS

(71) Applicant: KNAUF INSULATION, Vise (BE)

(72) Inventors: Richard Hand, St. Helens (GB); Liam Johnson, St. Helens (GB)

( * ) Notice: Subject to any disclaimer, the term of this patent is extended or adjusted under 35 U.S.C. 154(b) by 0 days.

(21) Appl. No.: 18/661,834

(22) Filed: May 13, 2024

(65) Prior Publication Data

US 2024/0293955 A1 Sep. 5, 2024

Related U.S. Application Data

(63) Continuation of application No. 17/788,538, filed as application No. PCT/EP2020/087581 on Dec. 22, 2020, now abandoned.

(30) Foreign Application Priority Data

Dec. 27, 2019 (GB) .................................... 1919346

(51) Int. Cl.
| | |
|---|---|
| *B27N 3/00* | (2006.01) |
| *B27D 1/04* | (2006.01) |
| *B27N 3/02* | (2006.01) |
| *C08K 3/36* | (2006.01) |

(52) U.S. Cl.
CPC .............. *B27N 3/002* (2013.01); *B27D 1/04* (2013.01); *B27N 3/02* (2013.01); *C08K 3/36* (2013.01); *C08K 2201/005* (2013.01); *C08K 2201/006* (2013.01); *C08K 2201/011* (2013.01)

(58) Field of Classification Search
CPC ....................................................... B27D 1/04
USPC ....................................................... 264/109
See application file for complete search history.

(56) References Cited

U.S. PATENT DOCUMENTS

| | | | | |
|---|---|---|---|---|
| 4,961,795 | A | * | 10/1990 | Detlefsen ................ C08L 61/06 156/335 |
| 5,130,419 | A | | 7/1992 | Brown et al. |
| 5,810,961 | A | | 9/1998 | Andersen et al. |
| 6,287,495 | B1 | | 9/2001 | Rosthauser |
| 2008/0099122 | A1 | | 5/2008 | Andersen et al. |
| 2011/0263757 | A1 | | 10/2011 | Rand et al. |
| 2014/0011042 | A1 | | 1/2014 | Sugawara et al. |

(Continued)

FOREIGN PATENT DOCUMENTS

| | | |
|---|---|---|
| CN | 102892855 A | 1/2013 |
| CN | 108137858 A | 6/2018 |

(Continued)

OTHER PUBLICATIONS

Oshika et al., (Machine-translation by Clarivate Analytics of JPH0759692B2, with full patent attached), Jun. 28, 1995. (Year: 1995).*

(Continued)

*Primary Examiner* — Abbas Rashid
*Assistant Examiner* — Gregory C. Grosso
(74) *Attorney, Agent, or Firm* — Barnes & Thornburg LLP

(57) ABSTRACT

A sugar-based binder composition for manufacturing a composite product, notably a wood board, comprises at least one further particulate additive selected from the group consisting of:
particulate additive(s) having a BET specific surface area which is ≥50 m²/g;
amorphous silica particles;
fumed silica particles; and
untreated fumed silica particles.

28 Claims, 4 Drawing Sheets

(56)                    References Cited

U.S. PATENT DOCUMENTS

| | | |
|---|---|---|
| 2017/0107318 A1 | 4/2017 | Nakajima et al. |
| 2020/0199416 A1 | 6/2020 | Tamogami et al. |
| 2021/0101309 A1 | 4/2021 | Hand et al. |

FOREIGN PATENT DOCUMENTS

| | | | | |
|---|---|---|---|---|
| JP | H04219204 A | 8/1992 | | |
| JP | 2000052307 A | 2/2000 | | |
| JP | 2004066464 A | 3/2004 | | |
| JP | 2011206927 A | 10/2011 | | |
| JP | 2012036369 A | 2/2012 | | |
| JP | 2012214687 A | 11/2012 | | |
| JP | 2013150703 A | 8/2013 | | |
| JP | 2013531082 A | 8/2013 | | |
| JP | 2015512967 A | 4/2015 | | |
| JP | 2016172826 A | 9/2016 | | |
| JP | 2018199793 A | 12/2018 | | |
| WO | 2011154368 A1 | 12/2011 | | |
| WO | WO-2017060447 A1 * | 4/2017 | ............ | B27N 3/002 |
| WO | 2019185760 A1 | 10/2019 | | |
| WO | 2019185762 A1 | 10/2019 | | |

OTHER PUBLICATIONS

Shimizu, K. et al., (Machine-translation by Clarivate Analytics of CN102892855A, with full patent attached), Jan. 23, 2013. (Year: 2013).*

Oshika et al., (Machine-translation by Clarivate Analytics of JPH0759692B2, with full patent attached), Jun. 28, 1995 (See NPL Filed on Mar. 6, 2025). (Year: 1995).*

"Fumed Silica—Wikipedia, the free encyclopedia", Feb. 10, 2015 (4 pages, XP055197250). (See NPL Filed on May 13, 2024). (Year: 2015).*

Shimizu, K. et al., (Machine-translation by Clarivate Analytics of CN102892855A, with full patent attached), Jan. 23, 2013 (See NPL Filed on Mar. 6, 2025). (Year: 2013).*

XVI Polyurethane Additives (II), Liu Yijun, Polyurethane, No. 07, pp. 86-89, Jul. 15, 2008.

Coating Additives Varieties and Performance Manual, Qian Fenglin et al, Chemical Industry Press, pp. 215-219, Nov. 1990.

"Fumed silica—Wikipedia, the free encyclopedia", Feb. 10, 2015 (4 pages, XP055197250).

Bleed-Through of Glue in Aircraft Plywood—Information Reviewed and Reaffirmed—No. 1541—Forest Products Laboratory, University of Wisconsin, Madison, WI (Jun. 1960, 23 pages).

Dry Film Gluing in Plywood Manufacture—Transactions of the American Society of Mechanical Engineers, Ray Sorensen, Louisville, KY (Jun. 1933, 12 pages).

Factors Affecting Bleedthrough of Phenolic Resin Adhesive in Hardwood Plywood—Wood Science and Technology (vol. 1), Ben S. Bryant and Jose M. Ramos Garcia (Jan. 1967, 17 pages).

Fumed silica as a filler for MUPF resin in the process of manufacturing water-resistant plywood—Eur. J. Wood Prod. (vol. 74), Dorota Dukarska and Rafal Czarnecki (Jul. 2015, 10 pages).

The effect of organofunctional nanosilica on the cross-linking process and thermal resistance of UF resin—J. Polym Res (vol. 23), Dorota Dukarska and Monika Bartkowiak (Jul. 2016, 8 pages).

PPH Petition Decision for co-pending U.S. Appl. No. 17/788,538 (3 pages)—Dec. 22, 2023.

Office action for co-pending U.S. Appl. No. 17/788,538 (22 pages)—Jan. 11, 2024.

Japanese Patent Office, "Notice of Reasons for Rejection" of Japanese Patent Application No. 2022-538929, mailed May 16, 2025, 16 pages (included appended English translation).

Japanese Patent Office, "Notice of Reasons for Rejection" of Japanese Patent Application No. 2022-538929, mailed Oct. 18, 2024, 9 pages (included appended English translation).

The State Intellectual Property Office of People's Republic of China, Office Action for Chinese Patent Application No. 202080090455.0, Jun. 6, 2023, 20 pages (included appended English translation).

The State Intellectual Property Office of People's Republic of China, [English translation of] Search Report for Chinese Patent Application No. 202080090455.0, Dec. 12, 2022, 1 page.

* cited by examiner

C4 A4

A4 C4

COMPOSITE PRODUCTS

CROSS-REFERENCE TO RELATED APPLICATIONS

This application is a continuation of U.S. application Ser. No. 17/788,538, filed Jun. 23, 2022, which is a U.S. national counterpart application of International Application Serial No. PCT/EP2020/087581, filed Dec. 22, 2020, under 35 U.S.C. § 371, which claims priority to GB Application Serial No. 1919346.5, filed Dec. 27, 2019, the disclosures of which are hereby incorporated herein by reference.

FIELD OF THE INVENTION

The present invention relates to composite products, notably wood boards, and a method for their production. The present invention provides binder compositions with properties including excellent curing rates, bond strength, parting strength, tensile strength and low swelling properties, ease of handling and good storage stability. More particularly the present invention provides binder compositions with properties including excellent bond strength, and low migration of the binder composition. More particularly the present invention provides for a reduced and/or an absence of bleedthrough of the binder composition, notably for plywood.

SUMMARY

In accordance with one aspect, the present invention provides a method of manufacturing a wood board as defined in claim 1. Further aspects are defined on other independent claims; the dependent claims define preferred or alternative embodiments.

DETAILED DESCRIPTION

Figure 1:
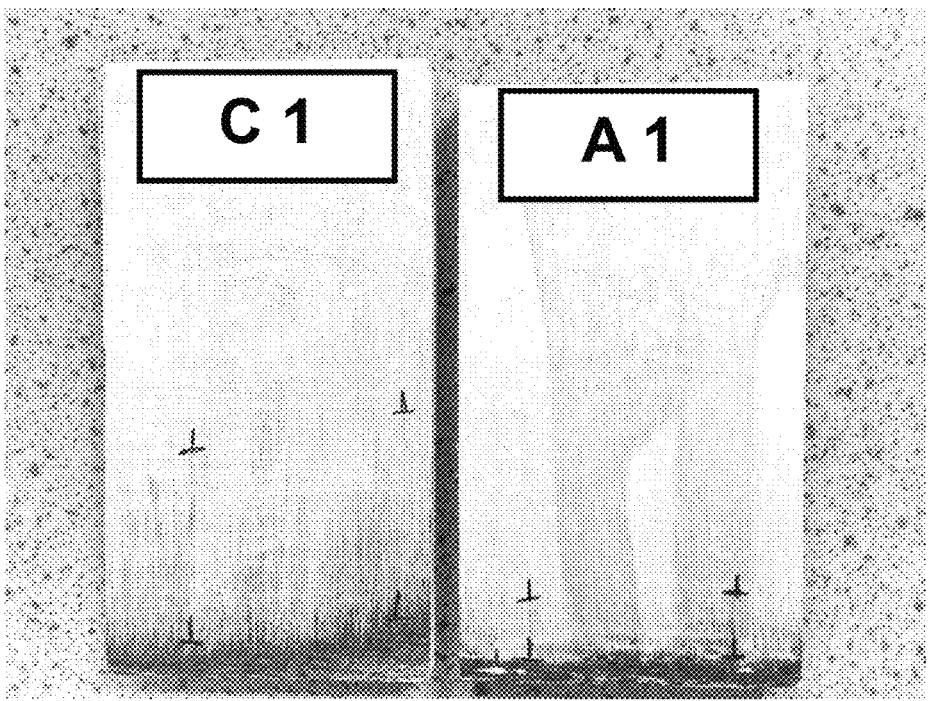
FIG. 1 shows a plywood made with a control binder composition and a plywood made with a binder composition comprising fumed silica, each being shown after tapered sanding to reveal binder migration.

In accordance with one of its aspects, the present invention provides a method of manufacturing a wood board, comprising:

applying a binder composition, notably in the form of an aqueous solution, to loose wood matter to provide resinated loose wood matter, arranging the resinated wood matter as a sheet of loosely arranged resinated wood matter; and subjecting the sheet of loosely arranged resinated wood matter to heat and pressure to cure the binder composition and to form the wood board from the sheet of loosely arranged resinated wood;

wherein the binder composition is a sugar-based binder composition which comprises:

polymerizable reactants, optional fillers, and at least one further particulate additive.

The at least one further particulate additive is selected from the group consisting of:

particulate additive(s) having a BET specific surface area which is $\geq 50$ m$^2$/g;

amorphous silica particles, notably synthetic amorphous silica particles;

fumed silica particles; and untreated fumed silica particles.

Alternatively, or additionally, the at least one further particulate additive may comprise particles, notably hydrophilic particles, having a mean diameter and/or a median ($D_{50}$) diameter of primary particles which is $\geq 5$ nm and/or $\leq 100$ nm.

The method may be used for the manufacture of wood boards, engineered wood, composite wood, man-made wood, or manufactured board notably manufactured by binding strands, particles, fibers, plies, veneers or layers of wood together with the binder to form the wood board. The wood board may be plywood, notably a wood based panel consisting of an assembly of layers (also called veneers), notably veneers glued together with the direction of the grain in adjacent layers being offset, notably offset at right angles; it may be plywood as described in and/or meeting the requirements of ISO 12465:2007 or EN 313-2:2000 or EN 313-1:1996 or EN 636:2003 (the contents of which are hereby incorporated by reference). The wood used for the veneers may be selected from cedar, Douglas fir, spruce, pine, fir, redwood, oak, beech, cherry, mahogany, poplar, eucalyptus, maple, birch and ilomba. Preferably, the wood used for the veneers is selected from poplar, oak, eucalyptus, birch and beech. Indeed, the method is particularly suitable for the manufacture of a plywood, notably for reducing bleedthrough of sugar-based binders. Bleedthrough is a tendency for a binder composition to disperse, seep or bleed through the cellulosic structure and/or fibers of a plywood board, particularly during curing of the binder composition when subjected to heat and pressure. A particular issue arises if bleedthrough occurs with dark coloured binder compositions as this can lead to undesired coloration or undesirable blemishes being visible at a surface layer of the plywood. The method is thus of particular utility for reducing bleedthrough of dark coloured binder compositions.

The method is also useful for the manufacture of wood particle board or resin bonded particle board, comprising or consisting of wood particles held together by the binder. In this case, the loose wood matter comprises, consists essentially of or consists of wood particles. The wood particles may comprise wood chips, wood flakes, wood strands sawmill shavings, saw dust, wood fibers and mixtures thereof. The wood particles may be selected from virgin wood, reclaimed wood or combinations thereof; the wood particles may be selected from birch, beech, alder, pine, spruce tropical wood and wood mixtures. Preferably, the wood particles contacted with the binder composition have a moisture content which is ≤8%, ≤6% or ≤5% by weight. The wood particles may be dried prior to being contacted with the binder composition; the dried wood particles may have a moisture content which is ≥1%, ≥1.5% or ≥2% and ≤5%, ≤4% or ≤3.5% by weight. The wood particle board may be a P1, P2, P3, P4, P5, P6 or P7 particle board as described and/or defined in EN 312:2003 (the contents of which is hereby incorporated by reference). The method is particularly suitable for boards meeting the requirements for a P4 board.

The wood board may be an oriented strand board (OSB), notably an OSB/1, OSB/2, OSB/3 or OSB/4 oriented strand board as described in and/or meeting the requirements of EN 300:2006 (the contents of which is hereby incorporated by reference).

The wood board may be a fiberboard, notably a hardboard (HB), a medium board (MBL or MBH), a softboard (SB) or a medium density fiber board (MDF), notably as described in and/or meeting the requirements of EN 622-1:2003 (the contents of which is hereby incorporated by reference). The wood board may be a medium density fiberboard MDF, notably a MDF.H, MDF.LA, MDF.HLS, L-MDF, L.MDF.H, UL1-MDF, UL2-MDF, or MDF.RWH, notably as described in and/or meeting the requirements of EN 622-5:2009 (the contents of which is hereby incorporated by reference).

The wood board may be provided with a facing, for example a veneer or a melamine layer, for example to improve its visual appearance and/or the durability of its surface(s).

In accordance with a further aspect, the present invention provides a method of manufacturing a composite product, comprising:

applying a binder composition, notably in the form of an aqueous solution, to non or loosely assembled matter to provide resinated matter, arranging the resinated matter to provide loosely arranged resinated matter; and subjecting the loosely arranged resinated matter to heat and/or pressure to cure the binder composition and to form the composite product;

wherein the sugar-based binder composition is a sugar-based binder composition which comprises:

polymerizable reactants;

optional fillers; and at least one further particulate additive;

wherein at least one further particulate additive is selected from the group consisting of:

particulate additive(s) having a BET specific surface area which is ≥50 m²/g;

amorphous silica particles, notably synthetic amorphous silica particles;

fumed silica particles; and untreated fumed silica particles.

Alternatively, or additionally, the at least one further particulate additive may comprise particles, notably hydrophilic particles, having a mean diameter and/or a median ($D_{50}$) diameter of primary particles which is ≥5 nm and/or ≤100 nm.

In accordance with further aspects, the present invention provides composite products, notably wood boards, plywood, and wood particle boards, manufactured in accordance with the methods described herein.

Any feature described herein in relation to a particular aspect of the invention may be used in relation to any other aspect of the invention.

The term "binder composition" as used herein means all ingredients applied to the loose matter e.g. the wood matter and/or present on the loose matter, e.g. the wood matter, notably prior to curing, (other than the loose matter itself and any moisture in the loose matter), including the polymerizable reactants, the optional fillers (if present), and the at least one further particulate additive. The binder composition may include one or more solvents; it preferably includes water so that the binder composition is provided as an aqueous solution; when provided as a solution, notably an aqueous solution, one or more components of the binder composition, notably the optional fillers and the at least one further particulate additive, may be present as a dispersion or an emulsion in the solution.

The term "polymerizable reactants" as used herein means reactants able to polymerize under curing conditions to form a polymeric binder. The polymerizable reactants cross-link when cured to form a cured binder which holds the previously loosely arranged material of the composite product, e.g. the wood matter of the wood board, together. The cured binder is preferably a thermoset resin; it is preferably water insoluble.

The term "dry weight of the binder composition" as used herein means the weight of all components of the binder composition other than any water that is present (whether in the form of liquid water or in the form of water of crystallization) and other than any other solvents that are present.

The polymerizable reactants may make up ≥80%, ≥90% or ≥95% and/or ≤99% or ≤98% by dry weight of the binder composition, notably where no or low quantities of optional fillers are present.

The at least one further particulate additive may make up ≥1%, ≥2%, ≥3%, ≥5%, or ≥7% and/or ≤15%, ≤13%, ≤12% or ≤10% by dry weight of the binder composition. The at least one further particulate additive may be present in the binder composition in an amount which is ≥0.5%, ≥1%, ≥2% or ≥3% and/or ≤25% or ≤20% by dry weight with respect to the dry weight of the polymerizable reactants.

In some embodiments, the binder composition includes one or more optional fillers, for example one or more fillers are preferably included for the manufacture of plywood; the optional filler(s) may make up ≥10%, ≥15%, ≥20% or ≥25% and/or ≤55%, ≤50% or ≤40% or ≤35% by dry weight of the binder composition and/or of the cured binder. Particularly where the binder composition comprises optional fillers, the polymerizable reactants may make up ≥40%, ≥50%, ≥55%, or ≥60% and/or ≤90%, ≤85%, ≤80%, ≤75% or ≤70% by dry weight of the binder composition.

The binder composition is preferably free of, or comprises no more than 2 wt %, no more than 5 wt % or no more than 10 wt % of urea formaldehyde (UF), melamine urea formaldehyde (MUF), phenol formaldehyde and combinations thereof.

The binder composition is preferably a "no added formaldehyde binder" that is to say that none of ingredients used to form the binder composition comprise formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

The term "a sheet of loosely arranged resinated wood matter" as used herein means that the resinated wood matter is assembled together with sufficient integrity for the sheet to be processed along a production line but without the resinated wood matter being permanently joined together in a way that is achieved by fully cross-linking the binder composition. Prior to curing, the binder composition preferably provides a stickiness or tackiness which holds the loosely arranged wood matter together. For example, in the case of wood particle board, the sheet of loosely arranged wood matter preferably has sufficient cohesion to be retained in the form of a sheet or mat, notably when passing along a production line, and/or being transferred between conveyor belts. In the case of plywood, the individual plies, i.e. the individual veneers, in a stack of resinated veneers preferably have sufficient cohesion to avoid relative movement between the veneers, notably when passing along a production line, and/or being transferred between conveyor belts.

The binder composition is a sugar-based binder composition. As used herein the term "sugar-based binder composition" means that at least 50% by dry weight of the polymerizable reactants comprise reactants selected from: i) one or more reducing sugar reactants; ii) one or more reactants which under curing conditions will generate one or more reducing sugar reactants; iii) curable reaction product(s) of one or more reducing sugar reactant(s); iv) reactants which under curing conditions will react with the one or more reducing sugar reactants; and v) combinations of the aforementioned reactants.
Preferably:
  a) the polymerizable reactants consist essentially of or consist of reactants selected from; or
  b) at least 60% by dry weight, more preferably at least 70% by dry weight, of the polymerizable reactants comprise reactants selected from;
  i) one or more reducing sugar reactants; ii) one or more reactants which under curing conditions will generate one or more reducing sugar reactants; iii) curable reaction product(s) of one or more reducing sugar reactant(s); iv) reactant(s) which under curing conditions will react with the one or more reducing sugar reactants; and v) combinations of the aforementioned reactants.
The reactant(s) which under curing conditions will react with the one or more reducing sugar reactants preferably comprise, consist essentially of or consist of one or more nitrogen containing reactants. The curable reaction product(s) of the one or more reducing sugar reactant(s) preferably comprise, consist essentially of or consist of reaction products of the one or more reducing sugar reactant(s) and the one or more nitrogen containing reactants.

As used herein, the terms "consists essentially of" and "consisting essentially of" is intended to limit the scope of a statement or claim to the specified materials or steps and those that do not materially affect the basic and novel characteristic(s) of the invention.

The at least one reducing sugar reactant may comprise: a monosaccharide, a monosaccharide in its aldose or ketose form, a disaccharide, a polysaccharide, a triose, a tetrose, a pentose, xylose, a hexose, dextrose, fructose, a heptose, or mixtures thereof. The at least one reducing sugar reactant may comprise and/or may be yielded in situ by carbohydrate reactant(s), notably carbohydrate reactant(s) having a dextrose equivalent of at least about 50, at least about 60, at least about 70, at least about 80 or at least about 90. The carbohydrate reactant(s) may be selected from the group consisting of sucrose, one or more non-reducing sugar, molasses, starch, starch hydrolysate, cellulose hydrolysates, and mixtures thereof. For example, at least one reducing sugar reactant may comprise or consist of reducing sugar reactant(s) yielded in situ by sucrose.

The at least one reducing sugar reactant may comprise, consist essentially of or consist of a combination of dextrose and fructose. The combination of dextrose and fructose may make up at least 80 wt % of the reducing sugar reactants. Alternatively or additionally, dextrose may make up at least 40 wt % of the reducing sugar reactants and/or the fructose may make up at least 40 wt % of the reducing sugar reactants. The at least one reducing sugar reactant may comprise, consist essentially of or consist of high fructose corn syrup (HFCS).

The at least one reducing sugar reactant may comprise reducing sugar reactant(s) selected from the group consisting of xylose, arabinose dextrose, mannose, fructose and combinations thereof, for example making up at least 80 wt % of the reducing sugar reactants.

As used herein, the term "nitrogen-containing reactant(s)" means one or more chemical compound which contain(s) at least one nitrogen atom and which is/are capable of reacting with the at least one reducing sugar reactant; preferably the at least one nitrogen-containing reactant consists of Maillard reactant(s), that is to say reactant(s) which is/are capable of reacting with the at least one reducing sugar reactant as part of a Maillard reaction.

The at least one nitrogen-containing reactant may comprise reactant(s) selected from the group consisting of: inorganic amines, organic amines, organic amines comprising at least one primary amine, salts of an organic amine comprising at least one primary amine, polyamines, polyprimary polyamines and combinations thereof, any of which may be substituted or unsubstituted. The at least one nitrogen-containing reactant may comprise $NH_3$. $NH_3$ may be used as such (e.g. in form of an aqueous solution) or as an inorganic or organic ammonium salt, for example an ammonium sulfate, an ammonium phosphate, diammonium phosphate, an ammonium citrate, triammonium citrate, or as a source of $NH_3$, e.g. urea. The nitrogen-containing reactant(s) may comprise an ammonium sulfate and/or an ammonium citrate. Preferably, the at least one nitrogen-containing reactant comprises, consists essentially of or consists of organic amine(s) comprising at least one primary amine, more preferably polyprimary polyamine(s). These may be optionally substituted. As used herein, the term "polyamine" means any organic compound having two or more amine groups and the term "polyprimary polyamine" means an organic compound having two or more primary amines ($-NH_2$). As used herein the term "substituted" means the replacement of one or more hydrogen atoms with other functional groups. Such other functional groups may include hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The polyprimary polyamine may be a diamine, triamine, tetramine, or pentamine. As used herein the term "diamine" means organic compound having two (and only two) amines, "triamine" means organic compound having three (and only three) amines, "tetramine" means organic compound having four (and only four) amines and "pentamine" means organic compound having five (and only five) amines. For example, the polyprimary amine may be: a triamine selected from diethylenetriamine (which is a diprimary triamine, i.e. diethylenetriamine has three amines, two of them being primary amines) or bis(hexamethylene)triamine; a tetramine, notably triethylenetetramine; or a pentamine, notably tetraethylenepentamine. The polyprimary polyamine may comprise diprimary diamine, notably 1,6-diaminohexane (hexamethylenediamine, HMDA) or 1,5-diamino-2-methylpentane (2-methyl-pentamethylenediamine). The polyprimary polyamine may comprise triprimary triamine, notably 4-(aminomethyl)-1,8-octanediamine (AMOD). One, two, several or each of the primary amine(s) of the polyprimary polyamine(s) may be present in the form of a salt, e.g. as an ammonium group ($—NH_3^+$). It is particularly preferred for the at least one nitrogen-containing reactant to comprise, to consist essentially of or to consist of polyprimary polyamines selected from the group consisting of: i) 1,6-diaminohexane; ii) 4-(aminomethyl)-1, 8-octanediamine; and iii) combinations of 1,6-diaminohexane and 4-(aminomethyl)-1,8-octanediamine. Thus, in one preferred embodiment, the polymerizable reactants of the sugar-based binder composition comprise, consists essentially of or consists of reactants selected from the group consisting of: i) the at least one reducing sugar reactant; ii) one or more polyprimary polyamines selected from 1,6-diaminohexane (hexamethylenediamine, HMDA), 4-(aminomethyl)-1,8-octanediamine (AMOD) and salts of these polyamines and iii) curable reaction products of (i) and (ii).

The polymerizable reactants may comprise, consist essentially of or consist of reactants wherein:
the at least one reducing sugar reactant makes up:
≥50%, ≥60% or ≥70% by dry weight of the polymerizable reactants, and/or
≤97%, ≤95%, ≤90% or ≤85% by dry weight of the polymerizable reactants, and/or the at least one nitrogen-containing reactant makes up:
≥3%, ≥5%, ≥7%, ≥10% or ≥15% by dry weight of the polymerizable reactants, and/or
≤50%, ≤40%, ≤30% or ≤25% by dry weight of the polymerizable reactants.

The polymerizable reactants may comprise, consist essentially of or consist of reactants consisting of between 60% and 95% by dry weight of the at least one reducing sugar reactant and between 5% and 40% by dry weight of the at least one nitrogen-containing reactant based on the total dry weight of polymerizable reactants.

The ratio of carbonyl groups in the at least one reducing sugar reactant to reactive amino groups in the at least one nitrogen-containing reactant may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2. As used herein, the term "reactive amino group" means any amino group in the at least one nitrogen-containing reactant which is capable of reacting with the at least one reducing sugar reactant. Specifically, examples of such reactive amino groups comprise primary and secondary amine(s).

The at least one nitrogen-containing reactant and the at least one reducing sugar reactant are preferably Maillard reactant(s). The at least one nitrogen-containing reactant and the at least one reducing sugar reactant (or their reaction product(s)) preferably react to form Maillard reaction products, notably melanoidins when cured. Curing of the binder composition may comprise, consist essentially of or consist of Maillard reaction(s). Preferably, the cured binder comprises polymer(s) which consist essentially of Maillard reaction products. The cured binder composition may comprise melanoidin-containing and/or nitrogenous-containing polymer(s); it is preferably a thermoset binder and is preferably substantially water insoluble.

The binder composition and/or the cured binder may comprise ester and/or polyester compounds.

The binder composition may be prepared by combining all the polymerizable reactants, notably by combining all of the at least one reducing sugar reactant and all of the at least one nitrogen-containing reactant in a single preparation step, for example by dissolving the reducing sugar reactant(s) in water and then adding the nitrogen-containing reactant(s). The term "single preparation step" is used herein to differentiate from a "multiple preparation step" preparation in which a first portion of polymerizable reactants are combined and stored and/or allowed to react for a pre-determined time before addition of further polymerizable reactants.

Alternatively, the binder composition may be prepared by:
combining reducing sugar reactant(s), notably all of the at least one reducing sugar reactant, with a first portion of the at least one nitrogen-containing reactant to provide an intermediate binder composition,
storing the intermediate binder composition; and
combining the intermediate binder composition with a second portion of the at least one nitrogen-containing reactant to provide all the polymerizable reactants of the binder composition.

The intermediate binder composition may comprise, consist essentially of or consist of reaction product(s) of the at least one reducing sugar reactant, with a first portion of the at least one nitrogen-containing reactant. The reactants may be heated to provide the intermediate binder composition; the intermediate binder composition may be subsequently cooled.

The first and second portions of the at least one nitrogen-containing reactant may be the same nitrogen-containing reactant or, alternatively they may be different nitrogen-containing reactants.

As used herein "storing the intermediate binder composition" means that the intermediate binder composition is stored or shipped for a prolonged time, notably without crystallization of the at least one reducing sugar reactant or gelling which would render the binder composition unusable. The intermediate binder composition may be stored for a period of at least 30 min, at least 1 h, at least 4 h, at least 12 h, at least 24 h, at least 96 h, at least 1 week, at least 2 weeks, or at least 4 weeks.

The optional filler(s) and/or the at least one further particulate additive may be added altogether or in several portions to the polymerizable reactants to form the binder composition to be applied to e.g. the loose wood matter. In one preferred embodiment, particularly for use in the manufacture of wood particle boards, in which the at least one further particulate additive comprises silica particles, notably fumed silica particles, the silica particles are prepared in the form of an emulsion and the emulsion of silica particles is combined with reactants of the binder composition.

In one preferred embodiment the at least one further particulate additive comprises, consist essentially of, or consist of a particulate additive having a BET specific surface area ≥50 $m^2$/g, ≥70 $m^2$/g, ≥100 $m^2$/g or ≥120 $m^2$/g and/or ≤600 $m^2$/g, ≤500 $m^2$/g, ≤400 $m^2$/g, ≤300 $m^2$/g, ≤250 $m^2$/g, ≤200 $m^2$/g, ≤180 $m^2$/g or ≤170 $m^2$/g. The BET specific surface area is measured in accordance with the ISO 9277 standard for calculating the specific surface area of solids. The at least one further particulate additive may comprise, consist essentially of or consist of a particulate additive, notable hydrophilic particles, having a mean diameter and/or a median ($D_{50}$) diameter of primary particles which is: i) ≥5 nm ≥7 nm, ≥10 nm and/or ii) ≤100 nm, ≤50 nm, ≤30 nm or ≤20 nm. The median particle diameter ($d_{50}$) refers to the particle size for which 50% of the sample has a smaller size and 50% of the sample has a larger size. Median particle diameter ($d_{50}$) and mean particle diameter may be determined via a laser diffraction method, for example using a Horiba LA 300 instrument. Samples may be de-agglomerated, for example using ultrasonic vibration for 2 minutes prior to measurement.

The at least one further particulate additive may comprise, consist essentially of, or consist of silica particles, notably amorphous silica particles, preferably synthetic amorphous silica particles. The silica particles may be fumed silica, also known as pyrogenic silica, they may be untreated fumed silica particles.

The at least one further particulate additive may be hydrophilic and/or comprise hydrophilic particles.

The optional filler(s), which are different from the at least one further particulate additive, may comprise, consist essentially of, or consist of almond shell flour, kaolin, and calcium carbonate. The optional filler(s) may make up ≥2%, ≥5%, ≥10%, ≥15%, ≥20% or ≥25% and/or ≤50% or ≤40% or ≤35% or ≤30% by dry weight of the binder composition.

The binder composition may comprise additional additive(s) different from the optional filler(s) and different from the at least one further particulate additive. The additional additive(s) may comprise one or more additional additives selected from waxes, dyes, release agents, formaldehyde scavengers (for example urea, tannins, quebracho extract, ammonium phosphate, bisulfite), water repellent agent, silanes, silicones, lignins, lignosulphonates and non-carbohydrate polyhydroxy component selected from glycerol, polyethylene glycol, polypropylene glycol, trimethylolpropane, pentaerythritol, polyvinyl alcohol, partially hydrolyzed polyvinyl acetate, fully hydrolyzed polyvinyl acetate, or mixtures thereof. Such additional additives are generally not reactants of the binder composition, that is to say they do not cross-link with the at least one reducing sugar and/or the at least nitrogen containing reactant (or reaction products thereof) as part of the curing of the binder composition.

The binder composition may be applied to the loose matter, e.g. wood matter, in the form of a liquid, notably in the form of an aqueous composition, for example comprising an aqueous solution and/or dispersion, notably in which the dry weight of the aqueous binder composition makes up: ≥40 wt %, ≥45 wt %, ≥50 wt %, ≥55 wt %, ≥60 wt % or ≥70 wt % and/or ≤95 wt %, ≤90 wt %, ≤85 wt % or ≤80 wt % of the total weight of the aqueous binder composition. Alternatively, the binder composition may be applied to the loose matter, e.g. wood matter, in the form of a solid, for example as a powder or as particles. The binder composition may be applied by being sprayed; this is particularly suitable for manufacturing wood particle board. The binder composition may be applied to wood particles by passing the wood particles through a spray of the binder composition or by spraying the binder composition over the wood particles, for example whilst the wood particles are being mixed. Preferably, the wood particles are mixed subsequent to application of the binder composition, for example by tumbling, notably in a mixer or bunker. The binder composition may be applied by being spread, for example as a continuous layer or as a discontinuous layer, for example as lines of binder; this is particularly suitable for the manufacture of plywood.

The wood boards, notably once cured, may comprise at least 70%, at least 80%, at least 90% or at least 95% by weight of wood matter.

The binder loading, that is to say the amount of binder applied to the loosely assembled matter, e.g. the loose wood matter, and calculated in terms of the dry weight of the binder composition applied to the loosely assembled matter with respect to the combined weight of i) the dry weight of the loosely assembled matter and ii) the dry weight of the binder composition applied to the loosely assembled matter, may be ≥1.5%, ≥2%, ≥2.5%, ≥3%, ≥5%, ≥7% and/or ≤15%, ≤13%, ≤11%.

The thickness of the wood board may be ≥5 mm, ≥8 mm, ≥10 mm, or ≥15 mm and/or ≤100 mm, ≤80 mm, ≤60 mm, ≤50 mm, ≤45 mm or ≤25 mm. Preferred thicknesses are in the range of 10 to 45 mm or 16 to 22 mm. The length of the wood board may be ≥1.5 m, ≥2 m, ≥2.5 m or ≥3 m and/or ≤8 m, ≤6 m or ≤5 m. The width of the wood board may be ≥0.5 m, ≥1 m, ≥1.2 m, ≥1.5 m or ≥1.8 m and/or ≤4 m, ≤3 m or ≤3.5 m. The wood boards may have edges which are trimmed and/or cut and/or machined. The wood boards may be piled up and provided as a package comprising a plurality of boards arranged and/or bound together, for example to facilitate transport; the package may comprise an enveloping film, for example of a plastics material.

Subjecting the sheet of loosely arranged resinated wood matter to heat and pressure to cure the binder composition and to form the wood board from the sheet of loosely arranged resinated wood may comprise pressing the sheet of loosely arranged resinated wood matter between heated belts or plates, for example in a hot press, for example at a pressure which is ≥20 bar, ≥25 bar or ≥30 bar and/or ≤80 bar, ≤75 bar, ≤70 bar or ≤65 bar to obtain a cured wood board. The temperature of the heated belts or plates may be ≥100° C., ≥110° C. or ≥120° C. and/or ≤280° C., ≤260° C., ≤240° C., ≤220° C. or ≤200° C. The press factor, that is to say the time during which the sheet of loosely arranged resinated wood matter is subjected to heat and pressure in a press to cure the binder composition and to form the wood board and expressed in seconds per mm of pressed thickness of the wood boards may be ≥2 s/mm, ≥3 s/mm, ≥4 s/mm or ≥5 s/mm and/or ≤10 s/mm, ≤9 s/mm, ≤8 s/mm or ≤7 s/mm.

During the pressing and/or heating and/or curing of the wood board, the internal temperature of the wood board, notably the temperature at the center of the board in its thickness direction, may be raised to a temperature which is:

a) ≥90° C., ≥100° C., ≥110° C., ≥115° C., ≥120° C., ≥130° C. or ≥140° C., and/or b) ≤200° C., ≤180° C., ≤170° C. or ≤160° C.

The temperature of the surface layer(s) of the wood board may be raised to a temperature which is:

a) ≥120° C., ≥130° C. or ≥140° C., and/or b) ≤260° C., ≤220° C., or ≤200° C.

Methods of manufacturing wood boards according to the present invention allow for cure speeds which are at least equivalent to those obtained with comparable binder systems. The shear strength values of wood boards, notably plywood, manufactured with the binder compositions of the present invention are improved when compared to that obtained with comparable binder systems. The bleedthrough, for example bleedthrough in plywood, which can be seen in some systems by discolouration of the surface wood veneer due to seepage of the binder composition, is reduced, notably suppressed, or substantially suppressed when compared to that obtained with comparable binder systems. It is believed that the improved properties of the binder compositions of the present invention are due to the use of the at least one further particulate additive.

Without wishing to be bound by theory, it is believed that the said at least one further particulate additive may act as an agent reducing or partially inhibiting migration of the binder composition. It is believed that the said reduction or partial inhibition of the migration of the binder composition within the loosely assembled matter, e.g. within the cellulosic matter of wood matter, enables retention of an efficient amount or concentration of binder composition, without dispersion of binder composition within the cellulosic matter, to efficiently bind the wood matter together, providing increased bond strength. Such reduction or partial inhibition of the binder composition migration within the wood matter, i.e. within the cellulosic matter, enables reduction, notably suppression, of undesired bleedthrough in plywood. Without wishing to be bound by theory, it is believed that the said at least further particulate additive does not provide its effect simply by modifying viscosity, since without the use of said at least one further particulate additive but with fillers to provide equivalent viscosity, the improvement on bond strength and bleedthrough were not observed. Without wishing to be bound by theory, it is believed that the said at least one further particulate additive may act at least partially as a blocker agent, enabling blockage of the pores of the wood matter, and enabling also partially less migration of the binder within the wood matter; however, it is believed again that this is not the only mechanism. Without wishing to be bound by theory, it is believed that the said at least further particulate additive, notably hydrophilic fumed silica, may reduce migration of the binder composition by forming hydrogen bond with the polymeric binder, notably by forming hydrogen bond between the silanol groups at the surface of the hydrophilic fumed silica with the polymeric binder, notably hydrogen bonding with the oxygen present with the sugar-based binder composition, providing a more compacted structure of the binder composition.

EXAMPLE 1

Examples A1 and A2 are binder compositions in accordance with the invention, wherein the binder composition comprises fumed silica (Silicon (IV) Oxide from Alfa Aesar, having a surface area between 130 to 170 $m^2/g$ and an average particle size of 12 nm) as the further particulate additive. Examples C1 and C2 are control binder compositions. The proportions of the different components are given in weight % based on the total aqueous weight of the sugar-based binder compositions as shown in Table 1. Proportions of the optional fillers and type of fillers used were adjusted in order to obtain binder composition with and without fumed silica for each type of nitrogen-containing reactant with similar viscosities.

TABLE 1

| Binder composition (solid content of the aqueous binder composition) | Fillers | | | Further particulate additive Fumed silica (weight %) | Polymerizable reactants (weight %) |
| | Almond shell flour (weight %) | Kaolin (weight %) | Calcium carbonate (weight %) | | |
|---|---|---|---|---|---|
| A1 (78.9%) | 0 | 23.8 | 0 | 5.9 | 49.2 |
| C1 (80.5%) | 15 | 15 | 5 | 0 | 45.5 |
| A2 (80.4%) | 0 | 29.4 | 0 | 5.5 | 45.5 |
| C2 (83.9%) | 15 | 15 | 5 | 0 | 48.9 |

TABLE 2

| Binder composition | nitrogen containing reactant | reducing sugar reactants | Dry weight ratio of reducing sugar reactants to nitrogen containing reactant | Solid content of the aqueous polymerizable reactants |
|---|---|---|---|---|
| A1 | AMOD | 50% Glu + 50% Fru | 70:30 | 70% |
| C1 | AMOD | 50% Glu + 50% Fru | 70:30 | 70% |
| A2 | HMDA | 50% Glu + 50% Fru | 70:30 | 70% |
| C2 | HMDA | 50% Glu + 50% Fru | 70:30 | 77% |

Key: Glu = glucose; Fru = fructose; AMOD = 4-(aminomethyl)-1,8-octanediamine; HMDA = 1,6-diaminohexane. For AMOD used in A1 and C1, the purity is around 93-98%. For HMDA used in A2 and C2, the solution used is a 70% solids solution Each of the binder compositions was prepared by combining the nitrogen containing component and the reducing sugar reactants in water in the proportions given in Table 2 to obtain a solution/dispersion of the polymerizable reactants. The optional fillers (herein almond shell flour, kaolin and calcium carbonate) and the fumed silica further particular additive were mixed with the aqueous solution/dispersion of the polymerizable reactants in the proportions given in the above Table 1. Then each binder composition was used to produce 5-ply plywood panels with the parameters set out in Table 3.

TABLE 3

| Panel dimensions (mm) | Press temperature (° C.) | Press pressure (MPa) | Duration of press | Wood species | Target glue dose (g/m²) |
|---|---|---|---|---|---|
| 390 × 390 × 10 | 140 | 0.464 | 7 min 15 sec | Poplar | 150 |

The shear strengths were measured in accordance with ASTM D 906-98 (2004). Two horizontal 12.9 cm strips were cut from each plywood panel manufactured. Then each strip was routed on both sides to a set depth to provide the notches required for the test. Twelve 2.5 cm samples from each of these strips were cut. The sample were then soaked in water at 20±3° C. for 24 hours. The samples were then immediately placed into the testometric machine and shear strength (pulled closed (compression) shear strength as defined in the ASTM D 906-98 standard) was measured. The results of the median of the shear strengths are given in the Table 4 below.

TABLE 4

| Binder composition used for the plywood | Median shear strength (pulled closed (compression)) (N/mm²) |
|---|---|
| A1 | 1.47 |
| C1 | 1.29 |
| A2 | 1.10 |
| C2 | 0.94 |

The results show that using binder compositions A1 and A2 comprising fumed silica gives better shear strengths (pulled closed (compression)) compared to using binder compositions C1 and C2 without fumed silica.

No bleedthrough was observed for the plywood made with the binder compositions A1 and A2.

EXAMPLE 2—BINDER MIGRATION

To evaluate binder migration, 5-ply plywood panels were produced with the panel parameters shown in Table 3 with binder compositions A1 and C1 as shown in Tables 1 and 2. The fumed silica used is the fumed silica as defined in Example 1.

Figure 2:
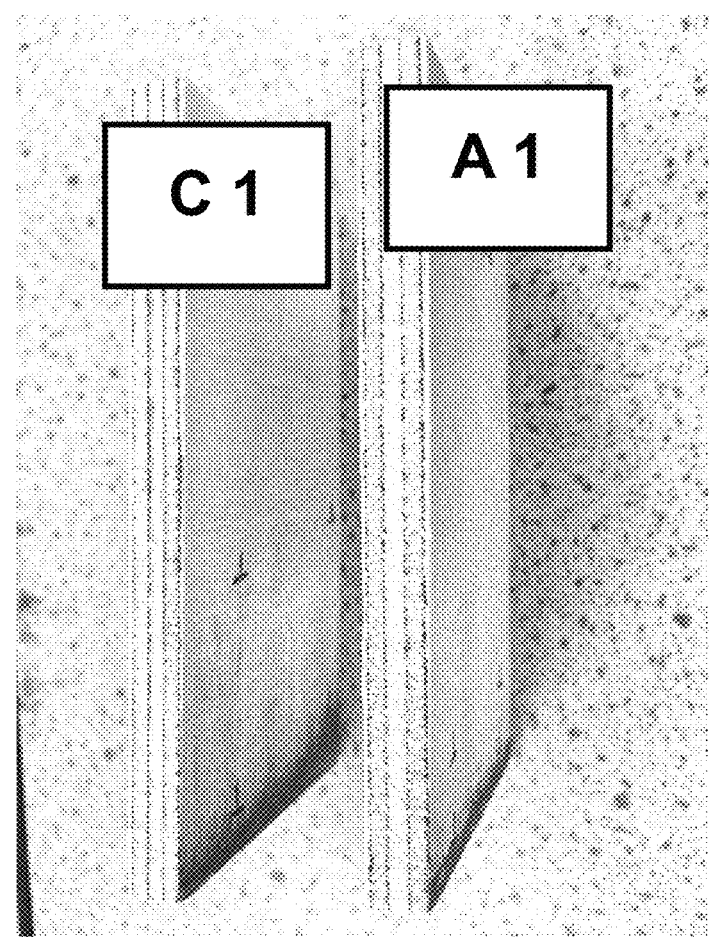
FIG. 2 is a side view of the plywood pieces shown in FIG. 1.

Binder migration was evaluated in accordance with the following protocol. A sanded gradient through the surface veneer into the glue line and through to the interior veneer was produced by sanding one of the major surfaces of each piece of plywood in a gradient from one side of the plywood to the other and breaking into the glue line near the deepest point. The back of the panel is lightly sanded to smooth out localised variations in wood thickness. This reveals a snapshot of the binder bleedthrough across the panel piece. Then one point on each side of the panel is taken (avoiding the centre third) where there is the longest distance between the glueline and clearly visible bleedthrough at the surface at that point, and this is marked. Then the thickness is measured at this point to determine the maximum observable thickness that the binder has travelled. The difference of these thicknesses is taken compared to the corresponding thickness at the glueline and that is the distance the binder is considered to have migrated. It is used comparatively to assess the bleedthrough performance of various binder compositions. The measurement was made on eight samples. FIGS. 1 and 2 show, after sanding: a) on the left-hand side plywood made with control binder composition C1 and b) on the right hand side plywood made with binder composition A1 comprising fumed silica.

The median results of the binder migration are given in Table 5 below.

TABLE 5

| Binder composition used for the plywood | Median binder migration (mm) |
| --- | --- |
| A1 | 0.23 |
| C1 | 0.65 |

The results show that less binder migration was observed with the binder composition A1 comprising fumed silica compared to the binder composition C1 without fumed silica.

EXAMPLE 3—TAPERED SANDING—MICROSCOPIC PHOTOS

Figure 3:
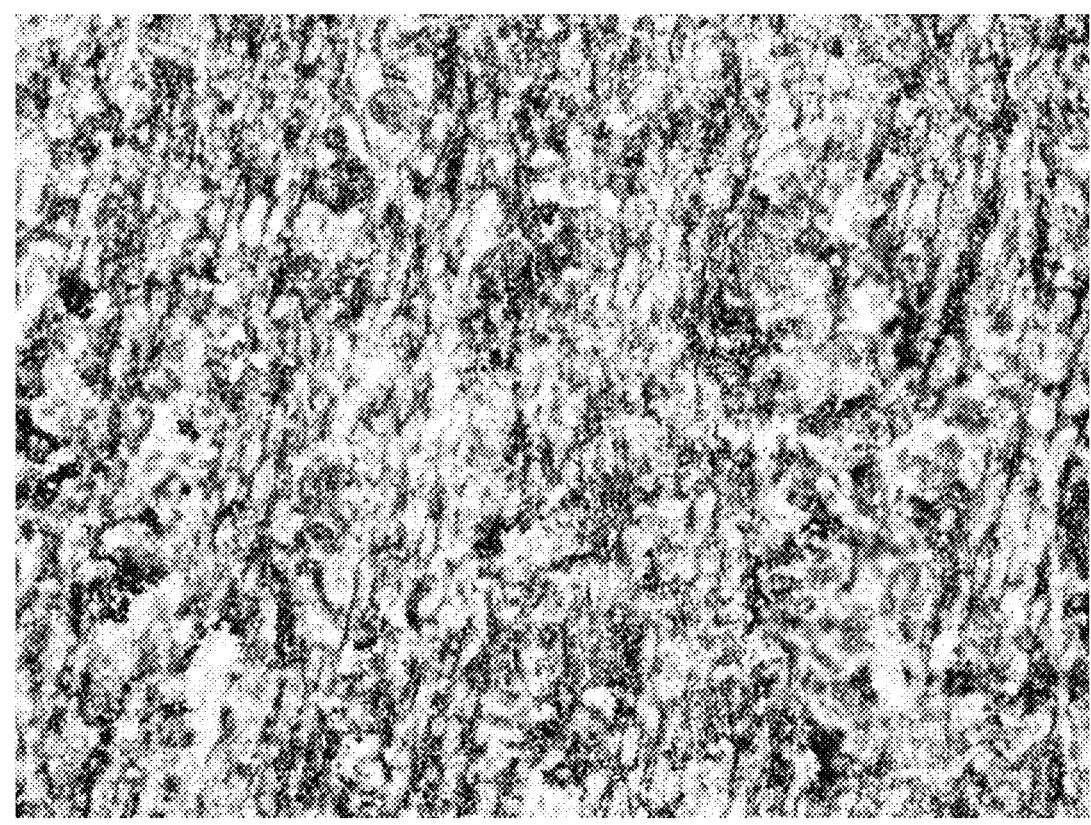
FIG. 3 shows an image taken with a microscope of the glue line of a tapered sanding plywood made with a control binder composition.
Figure 4:
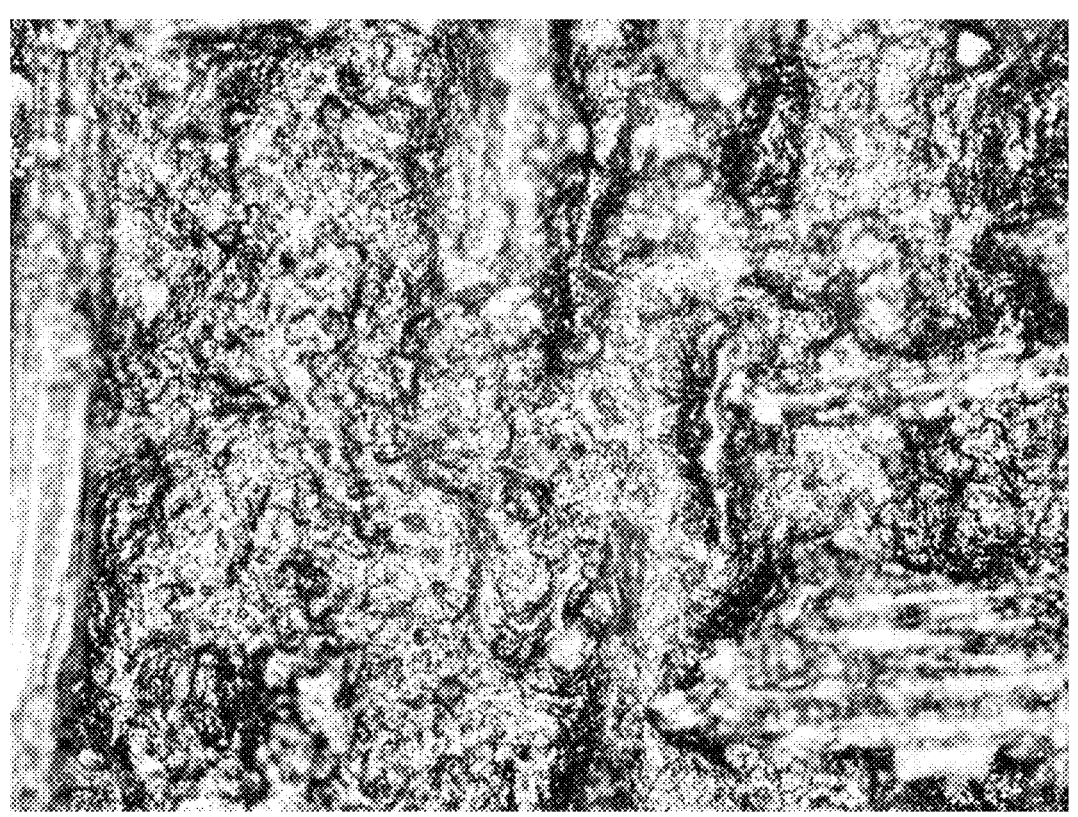
FIG. 4 shows an image taken with a microscope of the glue line of a tapered sanding plywood made with a binder composition comprising fumed silica.
Figure 5:
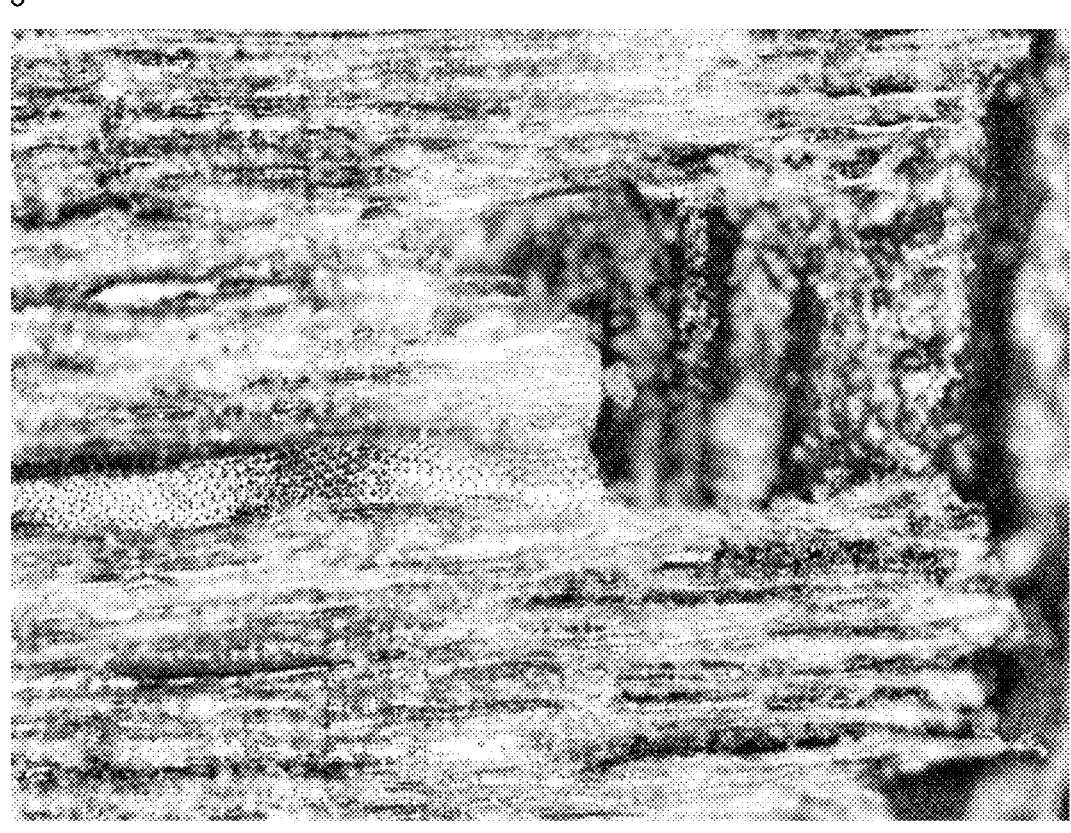
FIG. 5 shows an image taken with a microscope of the interface between cellulosic matter and cured binder for a plywood made with a binder composition comprising fumed silica.

Photographs of the tapered sanding plywood produced in Example 2 are presented in FIGS. 3, 4 and 5; the photographs were taken using a microscope at a magnification of about 100.

FIG. 3 shows the glue line of a plywood made with the control binder composition C1.

FIG. 4 shows the glue line of a plywood made with the binder composition A1.

FIG. 5 shows the interface between cellulosic matter and cured binder for a plywood made with the binder composition A1.

As can be seen in FIG. 3, the binder composition C1 seems to have at least partially penetrated into the cellulosic matter and/or has significantly migrated within the plywood. It is thus believed that a reduced amount of binder is present at the actual glue line to "bind" the cellulosic matter.

In comparison, in FIG. 4 very little cellulosic matter is observed since the binder composition has not penetrated within the cellulosic matter nor migrated and therefore the majority of the binder composition applied remains present at the actual glue line and is thus available to bind together the cellulosic matter of adjacent plies of the plywood.

As can be seen in FIG. 5 at the interface between the cellulosic matter and the cured binder, substantially none of the binder composition has been absorbed within the cellulosic matter.

EXAMPLE 4—SPREADING OF THE BINDER COMPOSITION

Example A4 is a binder composition in accordance with the invention, wherein the binder composition comprises fumed silica (Silicon(IV) Oxide from Alfa Aesar, having a surface area between 130 to 170 $m^2/g$ and an mean primary particle size of 12 nm). Example C4 is a control binder composition. The proportions of the different components are given in weight % based on the total weight of the aqueous sugar-based binder composition as shown in Table 6. Proportions of the optional fillers and type of fillers used were adjusted in order to obtain binder composition with similar viscosities.

TABLE 6

| Binder composition (solid content of the aqueous binder composition) | Fillers | | | Further particulate additive Fumed silica (weight %) | Poly-merizable reactants (weight %) |
| --- | --- | --- | --- | --- | --- |
| | Almond shell flour (weight %) | Kaolin (weight %) | Calcium carbonate (weight %) | | |
| A4 (79.4%) | 0 | 23.5 | 0 | 7.8 | 48.0 |
| C4 (80.5%) | 15 | 15 | 5 | 0 | 45.5 |

TABLE 7

| Binder com-position | nitrogen containing reactant | reducing sugar reactants | Dry weight ratio of Reducing sugar reactants to nitrogen containing reactant | Solid content of the aqueous poly-merizable reactants |
| --- | --- | --- | --- | --- |
| A4 | AMOD | 50% Glu + 50% Fru | 70:30 | 70% |
| C4 | AMOD | 50% Glu + 50% Fru | 70:30 | 70% |

Key: Glu = glucose; Fru = fructose; AMOD = 4-(aminomethyl)-1,8-octanediamine. For AMOD used in A4 and C4, the purity is around 93-98%.

Each of the binder compositions was prepared by combining the nitrogen containing component and the reducing sugar reactant in water in the proportions given in Table 7 to obtain a solution/dispersion of the polymerizable reactants. The optional fillers (herein almond shell flour, kaolin and calcium carbonate) and fumed silica were mixed with the aqueous solution/dispersion of the polymerizable reactants in the proportions given in Table 6.

Figure 6:
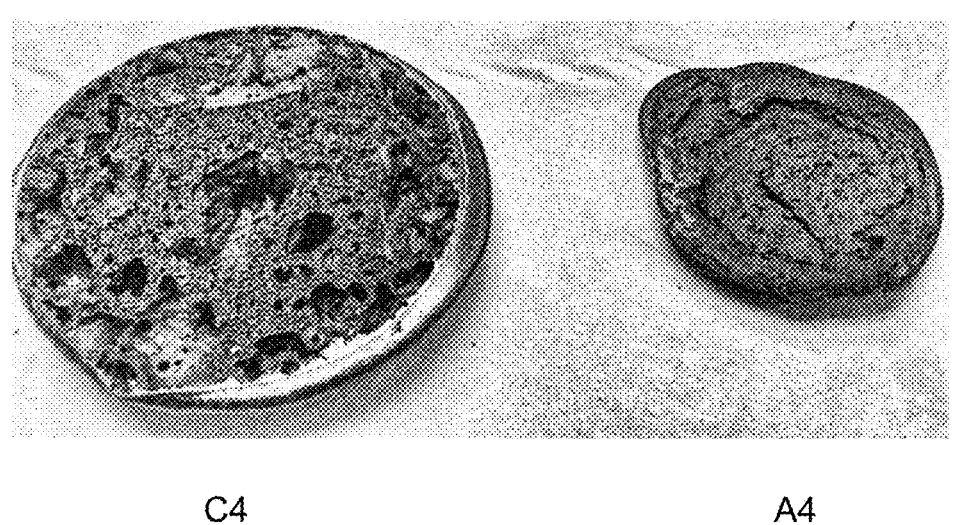
FIG. 6 is a photograph of cured binder obtained after two hours of curing for a control binder composition and a binder composition comprising fumed silica.

A mass of each of binder compositions C4 and A4 was applied to a metal tray and placed in an oven for 2 hours at 140° C. FIG. 6 is a photograph of the cured binder C4 (shown on the left-hand side) and cured binder A4 (shown on the right-hand side) obtained after the two hours of curing the binder compositions in the oven. As can be seen, cured binder composition A4 comprising fumed silica is more "compacted" than cured binder composition C4. In the cured binder composition C4, many "holes" having the appearance of foamed cells are visible; it is believed that this explains the greater spreading of binder composition C4.

Figure 7:
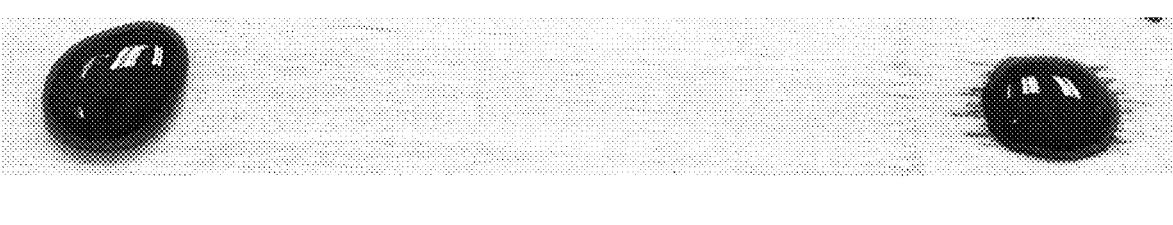
FIG. 7 is a photograph of a drop of an aqueous control binder composition and a drop of an aqueous binder composition comprising fumed silica on a poplar plywood face veneer after two hours.

FIG. 7 is a photograph of a drop of each aqueous binder composition A4 (shown on the left-hand side) and C4 (shown on the right-hand side) applied to a poplar plywood face veneer. The photograph was taken 2 hours after the deposition of the drop on the wood. As can be seen, the contact angle of the drop of the two binder compositions is clearly different. The drop of the aqueous binder composition C4 has already started to penetrate into the wood, while the drop of the aqueous binder composition A4 is still intact.

EXAMPLE 5—BINDER MIGRATION

Example A5 is a binder composition in accordance with the invention, wherein the binder composition comprises fumed silica having a surface area between 130 to 170 m²/g (Silicon(IV) Oxide from Alfa Aesar, mean primary particle size of 12 nm) and example A6 is a binder composition in accordance with the invention wherein the binder composition comprised fumed silica having a surface area between 175 to 225 m²/g (CAB-O-SIL® M5 from Cabot). Example C5 is a control binder composition. The proportions of the different components are given in weight % based on the total weight of the aqueous sugar-based binder composition as shown in Table 8.

TABLE 8

| Binder composition (solid content of the aqueous binder composition) | Filler Kaolin (weight %) | Further particulate additive Fumed silica (weight %) | Polymerizable reactants (weight %) |
|---|---|---|---|
| A5 (78.9%) | 23.8 | 5.9 | 49.2 |
| A6 (78.9%) | 23.8 | 5.9 | 49.2 |
| C5 (78.9%) | 29.7 | 0 | 49.2 |

TABLE 9

| Binder composition | nitrogen containing reactant | reducing sugar reactants | Dry weight ratio of Reducing sugar reactants to nitrogen containing reactant | Solid content of the aqueous polymerizable reactants |
|---|---|---|---|---|
| A5 | AMOD | HFCS | 70:30 | 70% |
| A6 | AMOD | HFCS | 70:30 | 70% |
| C5 | AMOD | HFCS | 70:30 | 70% |

Key: HFCS = High Fructose Corn Syrup; AMOD = 4-(aminomethyl)-1,8-octanediamine, the purity is around 93-98%.

Each of the binder compositions was prepared by combining the nitrogen containing component and the reducing sugar reactant in water in the proportions given in Table 9 to obtain a solution/dispersion of the polymerizable reactants. The optional filler (herein kaolin) and fumed silica were mixed with the aqueous solution/dispersion of the polymerizable reactants in the proportions given in Table 8. Then each binder composition was used to produce 5-ply plywood panels with the parameters set out in Table 10.

TABLE 10

| Panel dimensions (mm) | Press temperature (° C.) | Press pressure (MPa) | Duration of press | Wood species | Target glue dose (g/m²) |
|---|---|---|---|---|---|
| 390 × 390 × 10 | 120 | 0.464 | 5 min | Poplar | 150 |

Binder migration was evaluated in accordance with the protocol as defined in Example 2. The median results of the binder migration are given in Table 11 below.

TABLE 11

| Binder composition used for the plywood | Median binder migration (mm) |
|---|---|
| A5 | 0.27 |
| A6 | 0.39 |
| C5 | 0.56 |

The results show that less binder migration was observed with the binder compositions A5 and A6 comprising fumed silica compared to the binder composition C5 without fumed silica. Less binder migration was observed with the binder composition A5 than with binder composition A6.

The invention claimed is:

1. A method of manufacturing a wood board, comprising:
applying a binder composition in the form of an aqueous solution to loose wood matter to provide resinated loose wood matter,
arranging the resinated wood matter as a sheet of loosely arranged resinated wood matter; and
subjecting the sheet of loosely arranged resinated wood matter to heat and pressure to cure the binder composition and to form the wood board from the sheet of loosely arranged resinated wood;
wherein the binder composition is a sugar-based binder composition which comprises:
polymerizable reactants, wherein at least 50% by dry weight of the polymerizable reactants comprise reactants selected from: i) one or more reducing sugar reactants; ii) one or more reactants which under curing conditions will generate one or more reducing sugar reactants; iii) curable reaction product(s) of one or more reducing sugar reactant(s); iv) reactants which under curing conditions will react with the one or more reducing sugar reactants; and v) combinations of the aforementioned reactants; and
at least one particulate additive selected from the group consisting of:
particulate additive(s) having a BET specific surface area which is ≥50 m²/g as measured in accordance with the ISO 9277 standard;
amorphous silica particles; and
fumed silica particles;
wherein the at least one particulate additive makes up at least 5% by dry weight of the sugar-based binder composition.

2. The method according to claim 1, wherein the polymerizable reactants consist of Maillard reactant(s), wherein the Maillard reactants comprise:
the one or more reducing sugar reactants and/or the curable reaction product(s) of one or more reducing sugar reactant(s); and
one or more nitrogen containing reactants.

3. The method according to claim 1, wherein the at least one particulate additive is a particulate additive having a BET specific surface area which is ≥120 m²/g.

4. The method according to claim 3, wherein the at least one particulate additive has a BET specific surface area which is ≤250 m²/g.

5. The method according to claim 1, wherein the at least one particulate additive is a particulate additive having a mean primary particle size which is ≥10 nm and ≤20 nm.

6. The method according to claim 1, wherein the at least one particulate additive comprises synthetic amorphous silica particles.

7. The method according to claim 1, wherein the at least one particulate additive comprises fumed silica particles.

8. The method according to claim 1, wherein the at least one particulate additive comprises hydrophilic particles.

9. The method according to claim 1, wherein the sugar-based binder composition comprises no more than 10 wt % of the at least one particulate additive by dry weight of the sugar-based binder composition.

10. The method according to claim 1, wherein the at least one reducing sugar reactant is selected from the group consisting of xylose, dextrose, fructose and combinations thereof.

11. The method according to claim 1, wherein the polymerizable reactants comprise at least one reducing sugar reactant and at least one nitrogen-containing reactant.

12. The method according to claim 1, wherein the polymerizable reactants comprise curable reaction product(s) of at least one reducing sugar reactant and at least one nitrogen-containing reactant.

13. The method according to claim 2, wherein the at least one nitrogen-containing reactant comprises polyprimary polyamine(s) selected from the group consisting of: 1,6-diaminohexane; 4-(aminomethyl)-1,8-octanediamine; and combinations thereof.

14. The method according to claim 1, wherein the polymerizable reactants consist of Maillard reactant(s), wherein the Maillard reactants comprise:

the one or more reducing sugar reactants and/or the curable reaction product(s) of one or more reducing sugar reactant(s); and one or more nitrogen containing reactants;

wherein the one or more reducing sugar reactants are selected from the group consisting of xylose, dextrose, fructose and combinations thereof.

15. The method according to claim 1, wherein the polymerizable reactants consist of Maillard reactant(s), wherein the Maillard reactants comprise:

the one or more reducing sugar reactants and/or the curable reaction product(s) of one or more reducing sugar reactant(s); and one or more nitrogen containing reactants;

wherein the one or more nitrogen containing reactants are selected from the group consisting of 1,6-diamino-hexane, 4-(aminomethyl)-1,8-octanediamine and combinations thereof.

16. The method according to claim 2, wherein the polymerizable reactants comprise between 60 wt % and 95 wt % of the at least one reducing sugar reactant and between 5 wt % and 40 wt % of the at least one nitrogen-containing reactant based on the total dry weight of the polymerizable reactants.

17. The method according to claim 1, wherein the sugar-based binder composition comprises:

a) at least 60 wt % of the polymerizable reactants based on the total dry weight of the binder composition; and/or b) less than 70 wt % of the polymerizable reactants based on the total dry weight of the binder composition.

18. The method according to claim 1, wherein the sugar-based binder composition further comprises between 15 wt % and 35 wt % of filler(s) based on the total dry weight of the binder composition.

19. The method according to claim 1, wherein the sugar-based binder composition further comprises one or more fillers selected from the group consisting of almond shell flour, kaolin, calcium carbonate, and combinations thereof.

20. The method according to claim 1, wherein the binder composition is applied to the loose wood matter in the form of an aqueous solution which comprises 60 to 80 wt % of solids, based on the total weight of the aqueous binder composition.

21. The method according to claim 1, wherein the wood board comprises at least 95% by weight of wood matter.

22. The method according to claim 1, wherein the wood board is selected from the group consisting of: plywood, particleboard, P4 particleboard, an oriented strand board, fiberboard, a hardboard (HB), a medium board (MBL or MBH), a softboard (SB) and a medium density fiber board (MDF).

23. The method in accordance with claim 1, wherein:

the wood board is plywood comprising a stack of individual veneers, the loose wood matter comprises one or more of the individual veneers, the resinated wood matter comprises one or more individual resinated veneers, arranging the resinated wood matter as a sheet of loosely arranged resinated wood matter comprises arranging the resinated veneers in a stack wherein the direction of the grain in adjacent veneers is offset at right angles.

24. The method in accordance with claim 1, wherein:

the wood board is wood particle board, and the loose wood matter comprises wood particles.

25. The method of manufacturing plywood in accordance with claim 23, wherein bleedthrough of the binder composition through the veneers is reduced during curing.

26. A method of manufacturing plywood comprising a stack of individual veneers, the method comprising:

applying a binder composition in the form of an aqueous solution, to one or more of the individual veneers to provide one or more individual resinated veneers, arranging the one or more individual resinated veneers in the stack of individual veneers wherein the direction of the grain in adjacent veneers is offset at right angles; and subjecting the stack to heat and pressure to cure the binder composition to form the plywood;

wherein the binder composition is a sugar-based binder composition which comprises:

polymerizable reactants, wherein at least 50% by dry weight of the polymerizable reactants comprise reactants selected from: i) one or more reducing sugar reactants; ii) one or more reactants which under curing conditions will generate one or more reducing sugar reactants; iii) curable reaction product(s) of one or more reducing sugar reactant(s); iv) reactants which under curing conditions will react with the one or more reducing sugar reactants; and v) combinations of the aforementioned reactants; and at least one particulate additive selected from the group consisting of:

particulate additive(s) having a BET specific surface area which is $\geq 50$ m$^2$/g as measured in accordance with the ISO 9277 standard;

amorphous silica particles; and fumed silica particles;

wherein the at least one particulate additive comprises fumed silica particles and makes up at least 5% by dry weight of the sugar-based binder composition.

27. The method according to claim 26, wherein the sugar-based binder composition comprises no more than 10 wt % of the at least one particulate additive by dry weight of the sugar-based binder composition.

28. A method of manufacturing a wood board, comprising:

applying a binder composition in the form of an aqueous solution to loose wood matter to provide resinated loose wood matter, arranging the resinated wood matter as a sheet of loosely arranged resinated wood matter; and subjecting the sheet of loosely arranged resinated wood matter to heat and pressure to cure the binder composition and to form the wood board from the sheet of loosely arranged resinated wood;

wherein the binder composition is a sugar-based binder composition which comprises:

polymerizable reactants, wherein at least 50% by dry weight of the polymerizable reactants comprise reactants selected from: i) one or more reducing sugar reactants; ii) one or more reactants which under curing conditions will generate one or more reducing sugar reactants; iii) curable reaction product(s) of one or more reducing sugar reactant(s); iv) reactants which under curing conditions will react with the one or more reducing sugar reactants; and v) combinations of the aforementioned reactants; and fumed silica particles, wherein the fumed silica particles make up at least 5% by dry weight of the sugar-based binder composition.

\* \* \* \* \*